United States Patent [19]
Martin

[11] Patent Number: 5,218,503
[45] Date of Patent: Jun. 8, 1993

[54] 3½ INCH REMOVABLE CARTRIDGE FOR A DISK DRIVE

[75] Inventor: Stephen R. Martin, Louisville, Colo.

[73] Assignee: SyQuest Technology, Inc., Fremont, Calif.

[21] Appl. No.: 779,060

[22] Filed: Oct. 18, 1991

[51] Int. Cl.⁵ .............................................. G11B 23/03
[52] U.S. Cl. ................................... 360/133; 360/97.02
[58] Field of Search ............................. 360/133, 97.02; 369/291

[56] References Cited
U.S. PATENT DOCUMENTS

| | | | |
|---|---|---|---|
| 4,646,189 | 2/1987 | Sasaki et al. | 360/132 |
| 4,646,192 | 2/1987 | Droux et al. | 360/133 |
| 4,873,594 | 10/1989 | Chen | 360/133 |
| 4,885,652 | 12/1989 | Leonard et al. | 360/133 |
| 5,153,801 | 10/1992 | Ikebe et al. | 360/133 |

FOREIGN PATENT DOCUMENTS 0295920 12/1988 European Pat. Off. ............ 360/132
77210165 8/1988 Taiwan .

Primary Examiner—David C. Nelms
Assistant Examiner—John R. Lee
Attorney, Agent, or Firm—Fliesler, Dubb, Meyer & Lovejoy

[57] ABSTRACT

A cartridge 20 for a disk drive 130 includes a door 44 which can be urged from a closed position to an opened position which is substantially within the cartridge 20 and located in a plane substantially parallel to the disk 42 contained in the cartridge 20. The cartridge 20 includes a mounting mechanism 48 for accomplishing the motion of the door 44 from the closed to the opened position and a locking mechanism 50 for locking the door 44 in the closed position. Further, the cartridge 20 includes a groove 52 which extends rearwardly and across the cartridge in order to lockingly engage the cartridge in the drive 130.

34 Claims, 10 Drawing Sheets

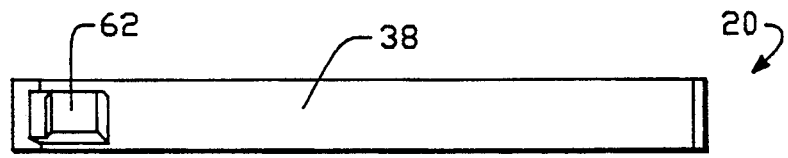
FIG.—6
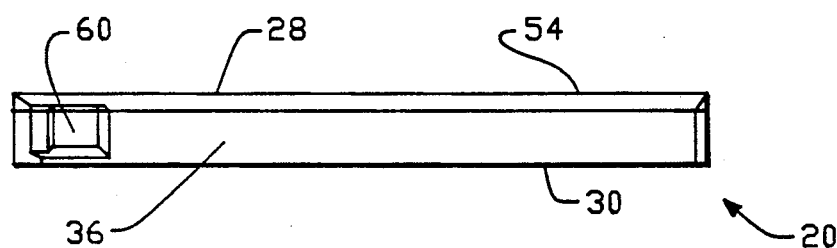
FIG.—7
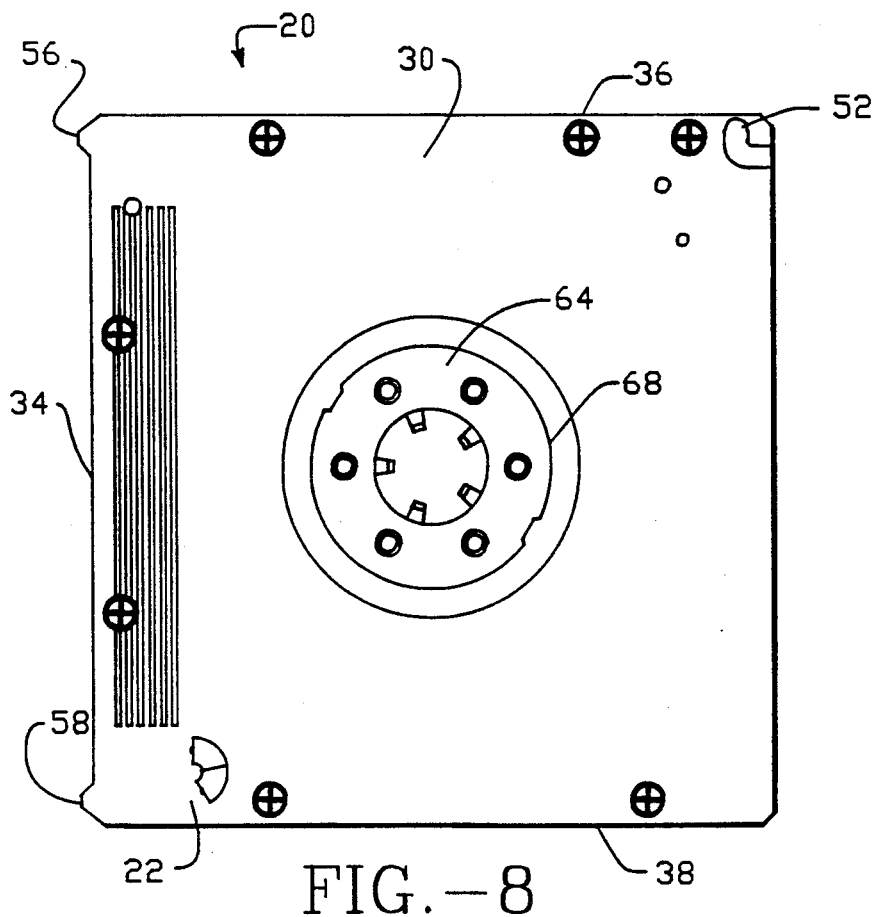
FIG.—8

FIG.—10

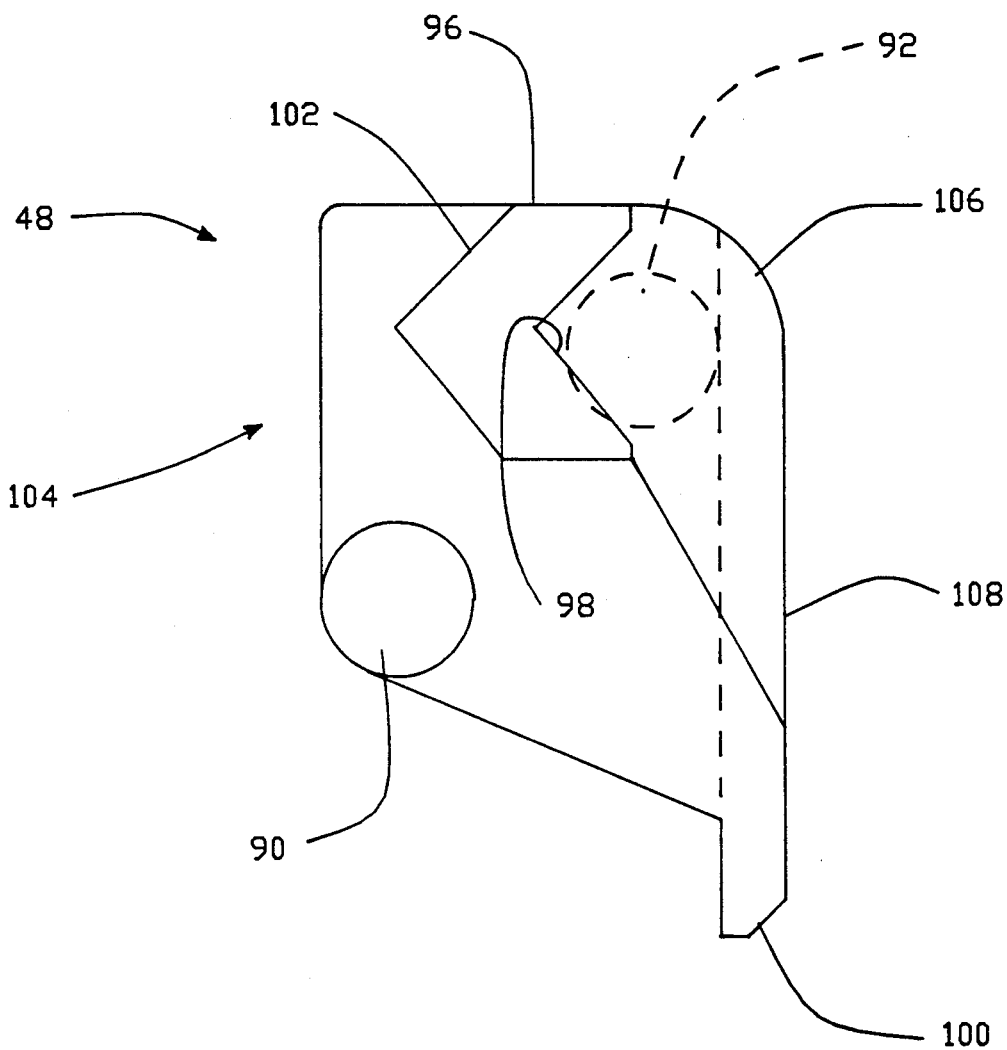
FIG.—14

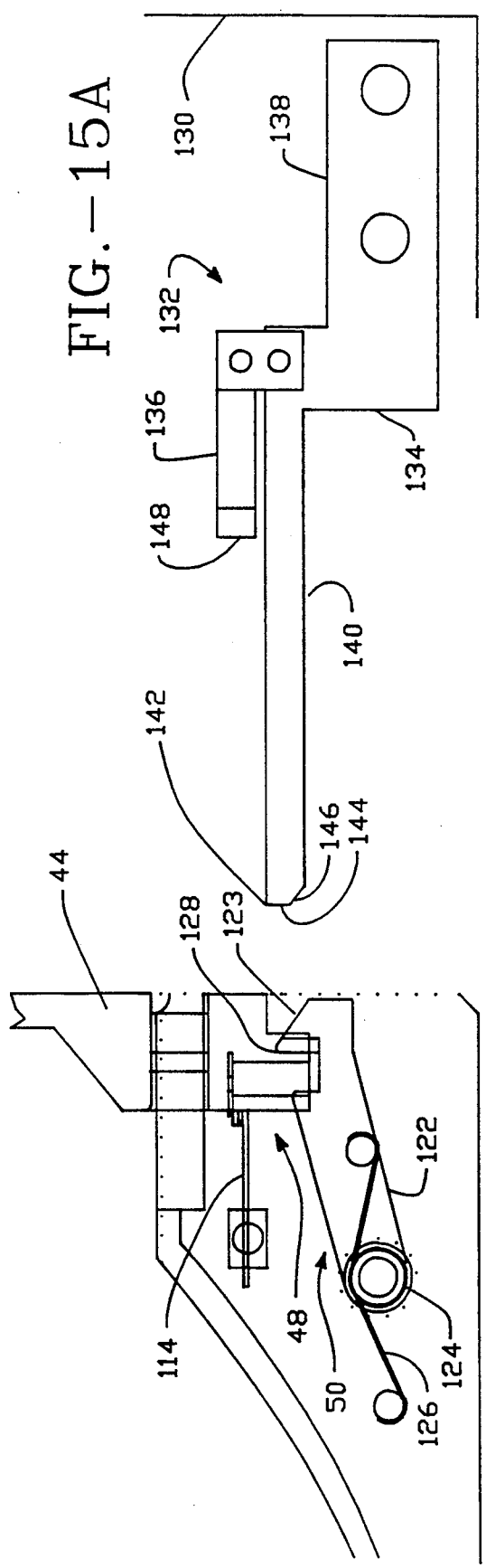

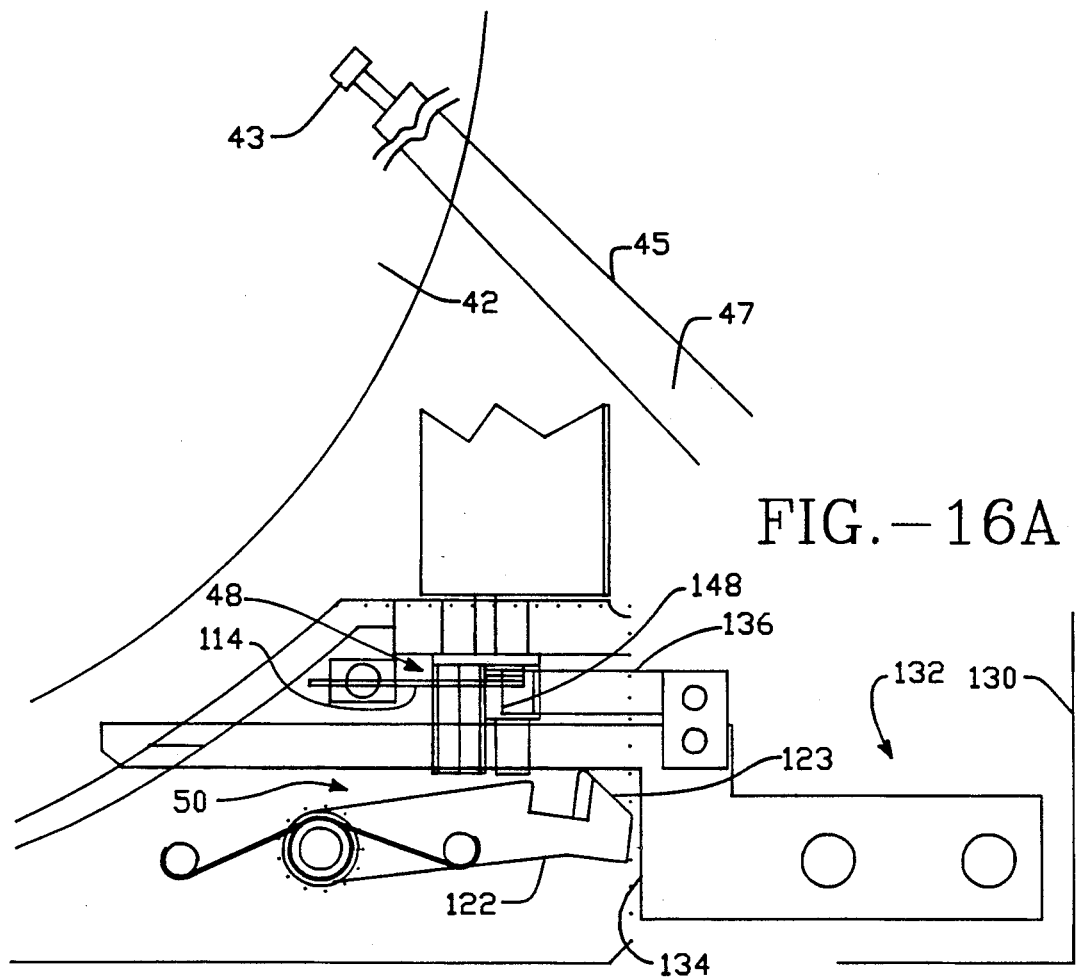
FIG.—16A
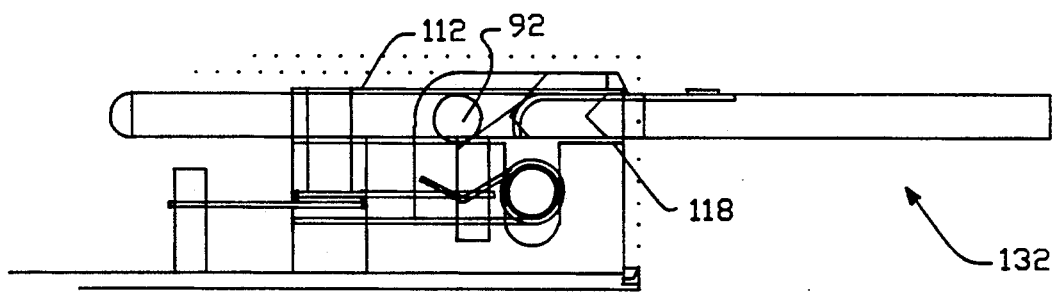
FIG.—16B

3½ INCH REMOVABLE CARTRIDGE FOR A DISK DRIVE

FIELD OF THE INVENTION

The present invention is directed to removable cartridges containing hard disks for use with disk drives.

BACKGROUND OF THE INVENTION

As the demand for smaller, portable and more powerful computers accelerates, less and less space can be afforded to disk memory storage. However, higher memory capacities are desired for this ever shrinking form factor. One method of accomplishing higher memory capacities is to provide for a removable cartridge disk drive such that any number of removable cartridges can be used to store as much data as is required for use with the computer. Additionally, this data can be secured in a location remote from the computer in order to ensure the confidentiality of the data when the computer is not in use.

In order to accommodate the ever decreasing form factor desirable for the configuration of a hard disk drive, there is a need to make the cartridge as compact as possible yet allow for an appropriate door mechanism enabling the read/write heads from the disk drive to enter the cartridge and to unload onto the disk containing the data.

In addition, there needs to be a cartridge configuration that cannot be inadvertently inserted into the drive in an incorrect manner and which can be positively interlocked with the drive. Thus, proper alignment is accomplished with the heads with respect to the disk so that the heads can be loaded onto the disk without damage to either the heads or the disk.

In addition, the cartridge, by its very nature, needs to have a port for access by the read/write head. This port needs to be as large as possible in order to allow access by the heads and also not to restrict the design of the head actuators and the drive itself.

The disk contained in the cartridge is mounted on a hub, which hub is provided through a port in the cartridge so that it can be engaged with the spindle motor of the drive, in order to impart rotational movement to the disk. As the cartridge is not hermetically sealed from the outside environment, there needs to be provided a mechanism for minimizing environmental contamination from collecting in the cartridge and causing interference between the head and disk, and potentially damage to the head or data on the disk.

SUMMARY OF THE INVENTION

The present invention is directed to accomplishing the needs recognized in the prior art.

In accordance with the invention, a removable cartridge for a disk drive includes a housing, a data storage disk, a mechanism for rotatably mounting the disk in the housing, and a housing door. The cartridge further includes a device for removably mounting the door relative to the housing so that the door is removable between a closed position and an open position. With the door in the open position, the door is positioned in a plane which is parallel to the disk and located substantially within the housing.

With such a configuration, with the door received in a plane parallel to the disk, the opening port uncovered by the door can be larger than openings with prior art cartridges. With an enlarged port, the heads can have increased access to the disk in the cartridge allowing for greater freedom of the design of the drive. Further, with the door received in the housing of the cartridge itself, the cartridge receiver defined by the disk drive can be reduced in size by the size of the door and thus the overall dimensions of the drive can be reduced.

In another aspect of the invention, the device for removably mounting the door includes a first surface which is adapted for engaging a finger from the drive in order to cause the door to pivot from the close to the open position and a second surface which engages a second finger from the drive in order to hold the door in the open position once it has been inserted into the drive.

In addition, the cartridge includes a locking device for looking the mounting device with the door in the closed position. Upon insertion into the drive, the finger of the drive causes the locking mechanism to unlock the mounting device so that the door can be pivoted by the finger to the open position.

In another aspect of the invention, the cartridge includes a recess which extends along and then across the direction of insertion of the cartridge into the drive in order to lockingly engage the cartridge in the drive. The recess is located immediately adjacent to the mounting device for the door so as not to reduce the available space for the port through the cartridge for allowing access by the heads.

In another aspect of the invention, the cartridge includes a beveled surface which is opposite the groove for assisting in the proper insertion and registration of the cartridge in the receiver of the drive. Still further, the cartridge includes tabs extending from the back thereof in order to prevent, along with the beveled surface, the cartridge from being inserted in an improper orientation.

The cartridge further includes recesses along the side thereof for purposes of allowing the cartridge to be handled by a mechanical feeding mechanism for insertion and removal from the drive.

In another aspect of the invention, the internal surface of the cartridge housing includes spiral fins for causing air to be pumped toward the hub. During the normal operation of the drive, with the disk spinning at a high rate of angular velocity, the disk tends to draw air from the space about the cartridge receiver through the annular opening between the hub and the cartridge and into the cartridge, potentially exposing the heads and/or the disk to contamination and damage. The spiral fins cause air to flow toward the hub and counter or stagnate the ability air and contaminates to be drawn into the cartridge interior adjacent to the hub.

From the above, it can be seen that the present invention addresses the concerns with respect to the prior art and provides for a cartridge with the desired form factor.

BRIEF DESCRIPTION OF THE FIGURES

FIG. 6 depicts a right end view of an embodiment of the cartridge of FIG. 1.

FIG. 7 depicts a left end view of an embodiment of the cartridge of FIG. 1.

FIG. 8 depicts a bottom plan view of the embodiment of the cartridge of the invention of FIG. 1.

FIG. 14 depicts a side view of the mounting device of FIG. 13.

FIGS. 15a and 15b depict plane and side views of the door mounting mechanism and lock mechanism, and a composite drive finger mechanism with the cartridge door in the closed position.

FIGS. 16a and 16b depict plane and side views of the door mounting mechanism and look mechanism, and a composite drive finger mechanism with the cartridge door in the opened position.

DETAILED DESCRIPTION OF THE PREFERRED EMBODIMENT

Figure 1:
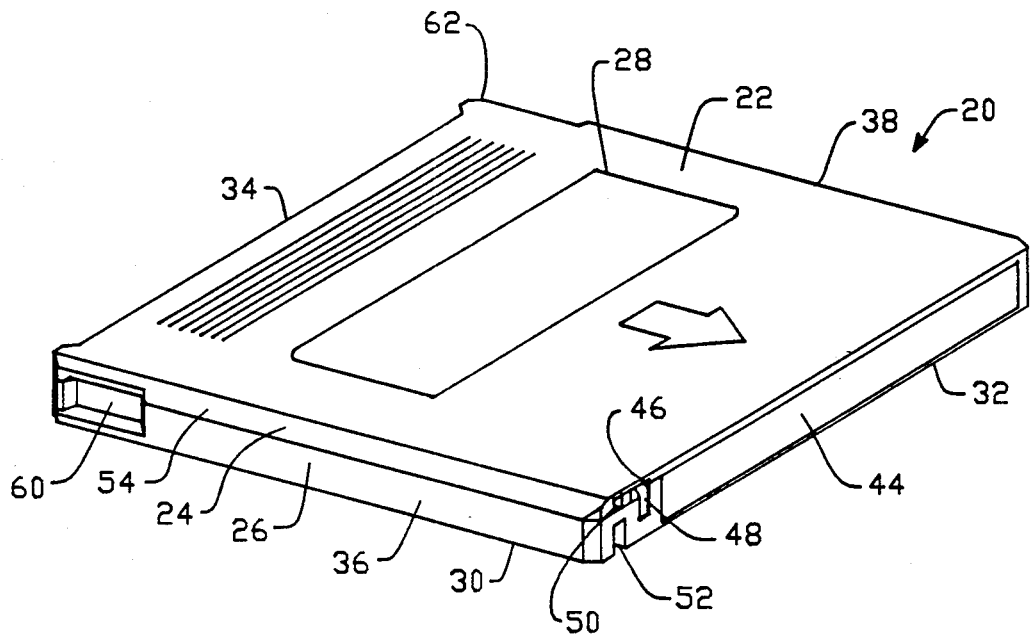
FIG. 1 depicts a perspective view of an embodiment of the cartridge of the invention with the door in the closed position.

With reference to the figures and in particular, FIG. 1, a preferred embodiment of the cartridge 20 is depicted. Cartridge 20 includes an outer housing 22 which includes a top portion 24 which is secured to a bottom portion 26. In a preferred embodiment, these portions are molded out of tough and endurable engineering plastic known in the trade, such as for example, polycarbonates and Lexan. In the preferred embodiment, the top and bottom portions 24, 26 are made of 6355 polycarbonates. The door described hereinbelow is comprised of, in a preferred embodiment, Lexan 920. In a more preferred embodiment, the door will be comprised of a stainless steel substantially rectangular portion which comprises the majority of the door, and which is made of stainless steel to ensure rigidity, with the tabs or hinges 82, 84 (described below) molded of Lexan 920 and simultaneously secured to the stainless steel portion.

The top portion 24 includes a top surface 28 and the bottom portion 26 includes a bottom surface 30. With the top and bottom portions 24, 26 secured together, the top and bottom portions 24, 26 of the housing 22 define a door or port 32, a back end 34, and first and second connecting ends 36, 38 which connect the door end 32 with the back end 34. As can be seen in FIG. 1, the top and bottom surfaces 28, 30 are substantially parallel to each other, and to disk 42 (FIG. 16a), with the ends 32, 34, 36 and 38 essentially perpendicular to the top and bottom surfaces 28, 30.

Figure 2:
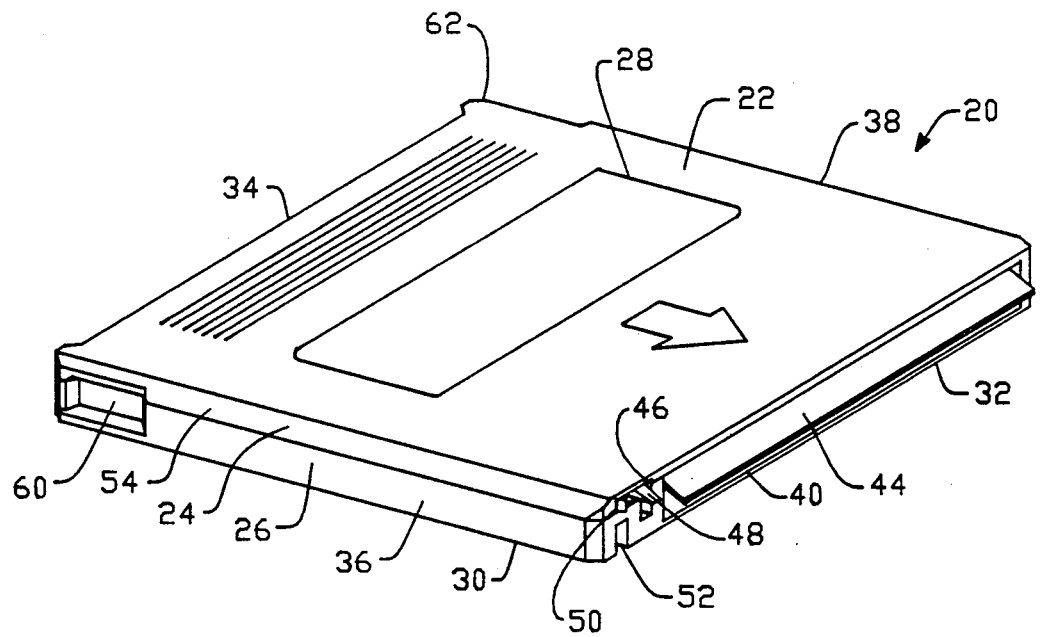
FIG. 2 depicts a perspective view of an embodiment of the cartridge of FIG. 1 with the door in a semi-opened position, between the fully closed and fully opened position.
Figure 3:
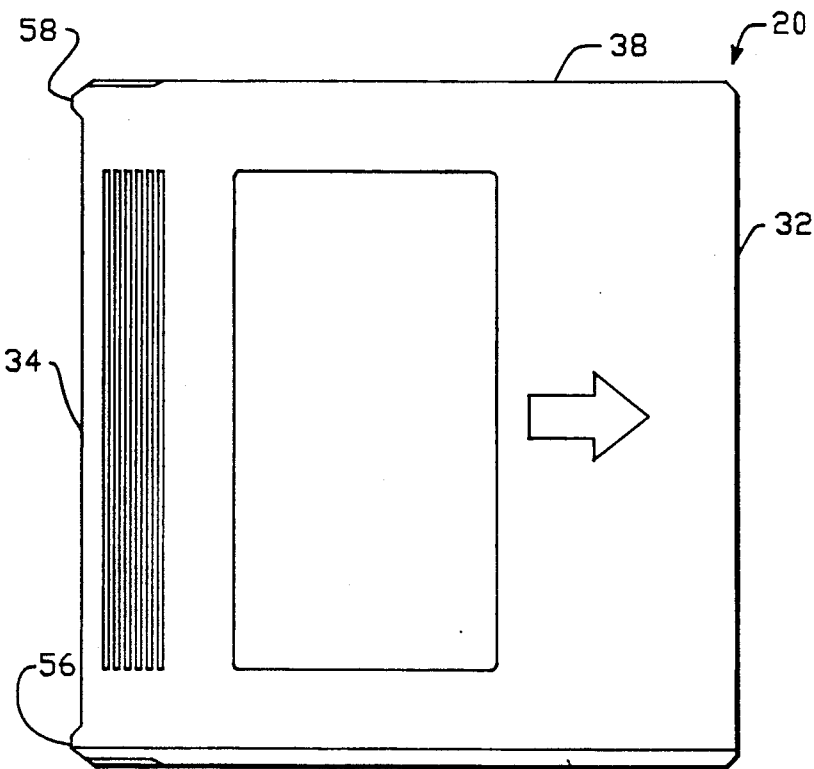
FIG. 3 depicts a plan view of an embodiment of the cartridge of FIG. 1.

The port end 32 defines a port 40 which provides access for read/write heads 43 so that these heads 43 (FIG. 16a) can be unloaded by actuator arm 45 onto the disk 42 contained in the cartridge 20. As can be seen in FIGS. 1 and 2, the cartridge door 44 is mounted adjacent the port 40 such that the door can be positioned from a closed position as shown in FIG. 1, completely closing off port 40, and therefrom move to a partially or semi-open position as shown in FIG. 2, and finally to a fully opened position as depicted in FIGS. 16a, 16b.

As can be seen in FIGS. 1 and 2, immediately adjacent to the left of the door 44 is an "L" shaped slot 46 which allows access to the door mounting mechanism 48 (FIG. 13) and the door locking mechanism 50 (FIGS. 15a and 15b), both of which will be described in greater detail hereinbelow. Immediately below the "L" shaped slot 46 is, as can be seen in FIGS. 1, 2 and 8, a "J" shaped groove 52. The "J" shaped groove 52 extends through the door end 32 and then rearwardly and outwardly. The "J" shaped groove 52, as will be explained further hereinbelow, accepts a member from a disk drive in order to have the cartridge interlockingly received in the drive. Such a mechanism is contemplated in U.S. patent application Ser. No. 07/722,837, entitled "REMOVABLE CARTRIDGE DISK DRIVE WITH AN INTERLOCKING MECHANISM FOR A DISK DRIVE" and filed Jun. 28, 1991, which application is assigned to the present assignee of this case and is incorporated herein. Adjacent to the location of the "L" shaped slot 46 and opposite the "J" groove 52 and defined through the top surface 28 and the first connecting end 36 is a beveled portion 54 which extends the length of the first connecting end 36. This beveled portion 54 is compatible with a slanted portion of the disk drive in order to ensure that the cartridge is inserted into the drive in the proper orientation and that the cartridge is properly registered in the drive so that the heads can be unloaded onto the disk.

As can be seen in FIGS. 1, 2, 3 and 8 cartridge 20 includes tabs 56, 58 which extend from the back end 34 of the housing 22. These tabs 56, 58 ensure that the length of the cartridge 20 from the door end 32 to the back end 34 is longer than the width of the cartridge 20 which is defined as the distance between the first and second connecting ends 36, 38 in order to ensure that the cartridge cannot be inserted sideways into the drive.

The housing 22 further defines first and second recesses 60, 62 which can be used to grab the cartridge with either human or mechanical fingers in order to select the cartridges from a library and insert the cartridge into the drive.

The design of the cartridge 20 has been accomplished in order to maximize the size of the port 40 and to advantageously position the door 44 in the door open position so that the actuator arm and heads of the disk drive will have maximum exposure to the disk 42 contained in the cartridge 20. To this end, the door 44 was designed to be received substantially above and in the plane parallel to the disk 42 as oan be seen in FIGS. 16a and 16b. Further as oan be seen in FIGS. 16a and 16b, the door is received in the open position substantially within the housing 22 of the cartridge 20. Thus, this design does not add to the overall length of the cartridge with the door in the open position and accordingly, reduces the length of the cartridge receiver in the drive. With the door received in the cartridge, the pivot point 47, which is fixed to the drive 130, of the actuator arm 45 can be positioned closer to the center of the rotation of the disk. This provides for a compact design and optimizes the performance of the head with respect to the tracks on the disk. The reason for this is that with a rotary actuator arm, such as actuator arm 45, the angle with respect to which the head addresses the various tracks is more consistently tangential across the range of tracks and further the geometry of the actuator arm in relationship to the disk causes the heads to fly above the disk in a more consistent and constant flying height with increased accuracy for the read/write operation of the head. Further with the door fully received in the open position in the cartridge, there is less possibility that damage oan be done to the door as it is being received in the disk drive.

Further, in order to maximize the port 40, the "L" shaped slot 46, through which access can be obtained to the door mounting mechanism 48 and door locking mechanism 50 is located to the left of the door port 40. Immediately adjacent to the slot 46 is the bevel 54, and immediately therebelow through the bottom surface 30 is defined the "J" shaped groove 52. With the "L" shaped slot 46, the bevel 54, and the "J" shaped groove 52 so positioned, the door 44 can extend rightwardly therefrom substantially the full length of the door end 32, to immediately adjacent the connecting side 38. With the bevel 54 extending through the top surface 28 opposite to the "J" groove 52, the cartridge can be positively registered in the receiver of the drive with a member from the drive engaging and lockingly being received in the "J" groove 52 and with the bevel 54 mating to a mating beveled surface in the cartridge receiver of the drive.

As can be seen in FIG. 8, the cartridge 20 includes a tub 64 to which the disk 42 is mounted. Mounted onto hub 64 is an armature plate 65 which contacts the spindle motor of the disk drive. A portion of the hub 64 and the armature plate 65 is received through a port 66 defined in the bottom surface 30 of the housing 22. Disposed in the hub 64 are a plurality of five downwardly depending teeth 68 which are urged apart as they are received over a spindle hub as is known in the trade.

Figure 9:
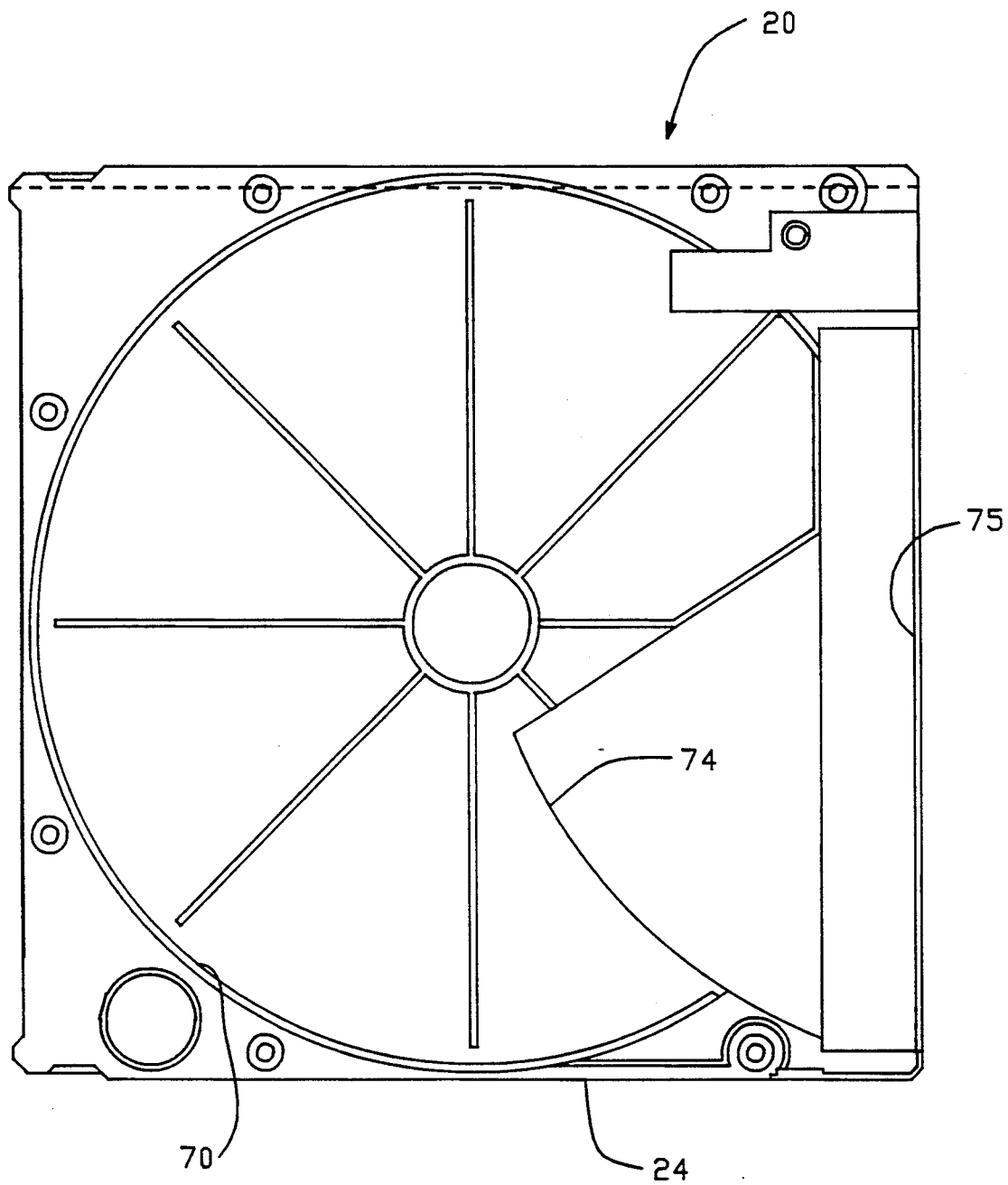
FIG. 9 depicts an internal surface for the top of the cartridge of FIG. 3.
Figure 10:
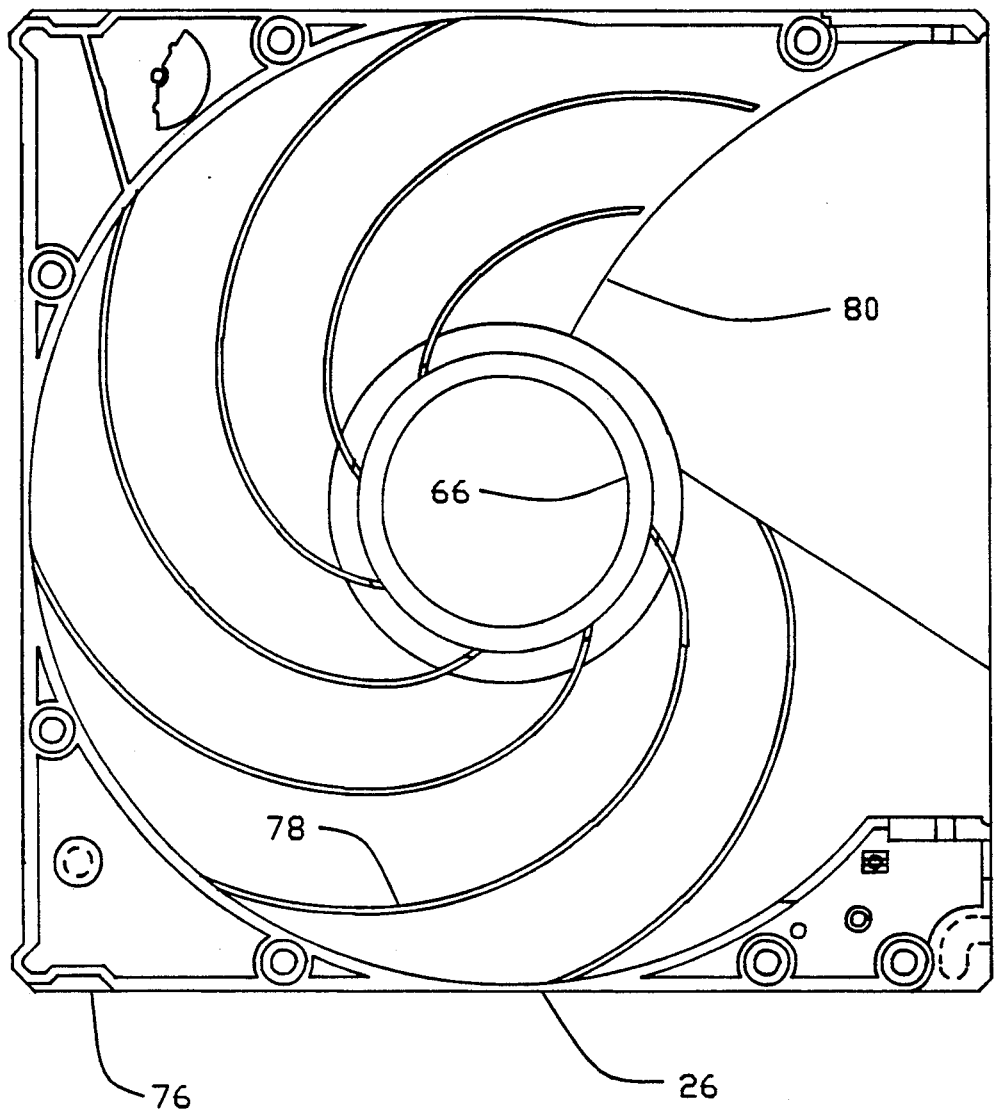
FIG. 10 depicts an internal surface for the bottom of the cartridge of FIG. 8.

Turning to FIGS. 9 and 10, the top portion 24 and bottom portion 26 are depicted. In FIG. 9, the internal surface 70 of the top portion 24 is depicted. This internal surface 70 includes a plurality of radial fins 72 which provide structural support for the top portion 24 and additionally act as a baffle to retard the flow of air as the disk is spinning. As can be seen in FIG. 9, a substantially triangular shaped recess 74 is provided adjacent a rectangular door receiving recess 75 in the inner surface 70 in order to allow additional clearance for receiving the actuator arms and heads mounted thereon as the heads are unloaded onto the disk.

FIG. 10 depicts the inner surface 76 of the bottom portion 26. This inner surface 76 defines a plurality of inwardly spiralling fins 78 which end at the hub port 66. These fins 78 are designed to act as a centrifugal pump, forcing air from inside of the housing to the hub 68 and port 66 in order to counteract the tendency of the spinning disk to draw air, along with contaminating particulate, from the outside of the cartridge through the port 66 into the cartridge. In a preferred embodiment, the plurality of the spiralling fins 78 are disposed such that fins 78 spiral inwardly toward port 66 substantially in the direction of rotation of the disk mounted on the hub. Further, as can be seen in FIG. 10, a triangular recess 80 is defined in the internal surface 76 in order to provide additional clearance for the actuator arms and heads to be received within the housing.

Figure 4:
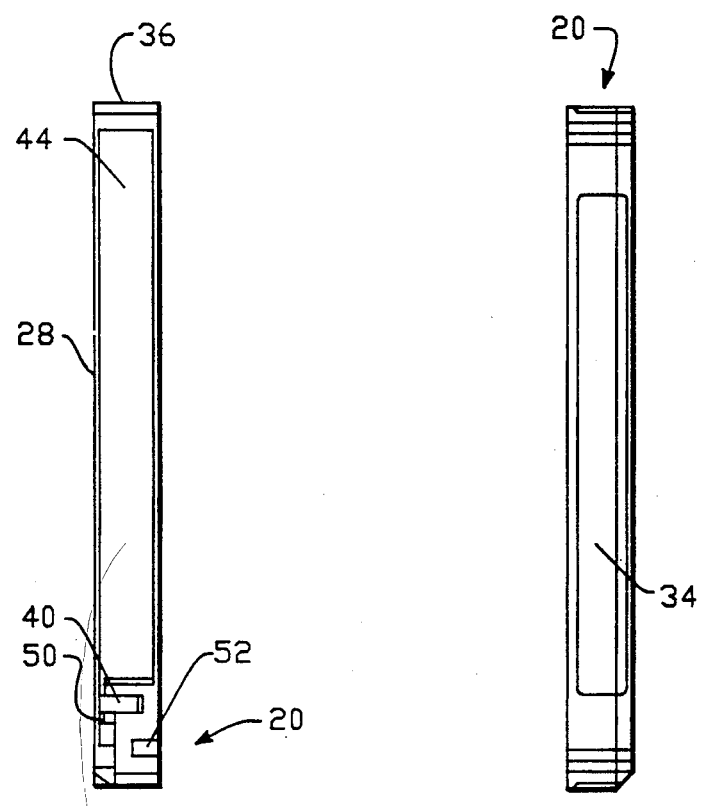
FIG. 4 depicts a door end view of an embodiment of the cartridge of FIG. 1.
Figure 5:
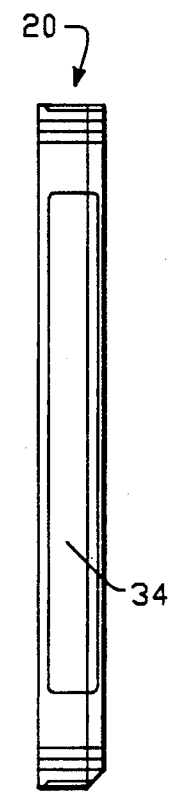
FIG. 5 depicts a back end view of an embodiment of the cartridge of FIG. 1.
Figure 11:
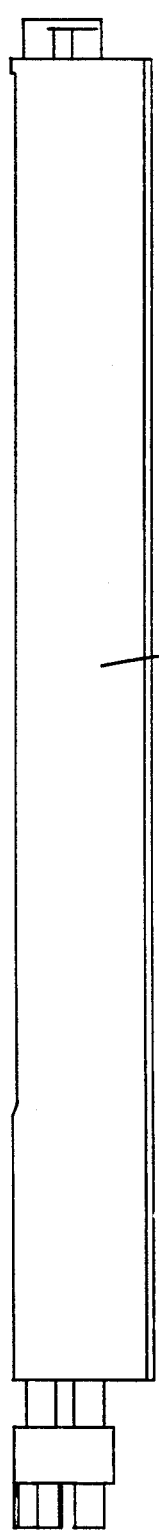
FIG. 11 depicts a front view of the door of the embodiment of FIG. 1.
Figure 12:
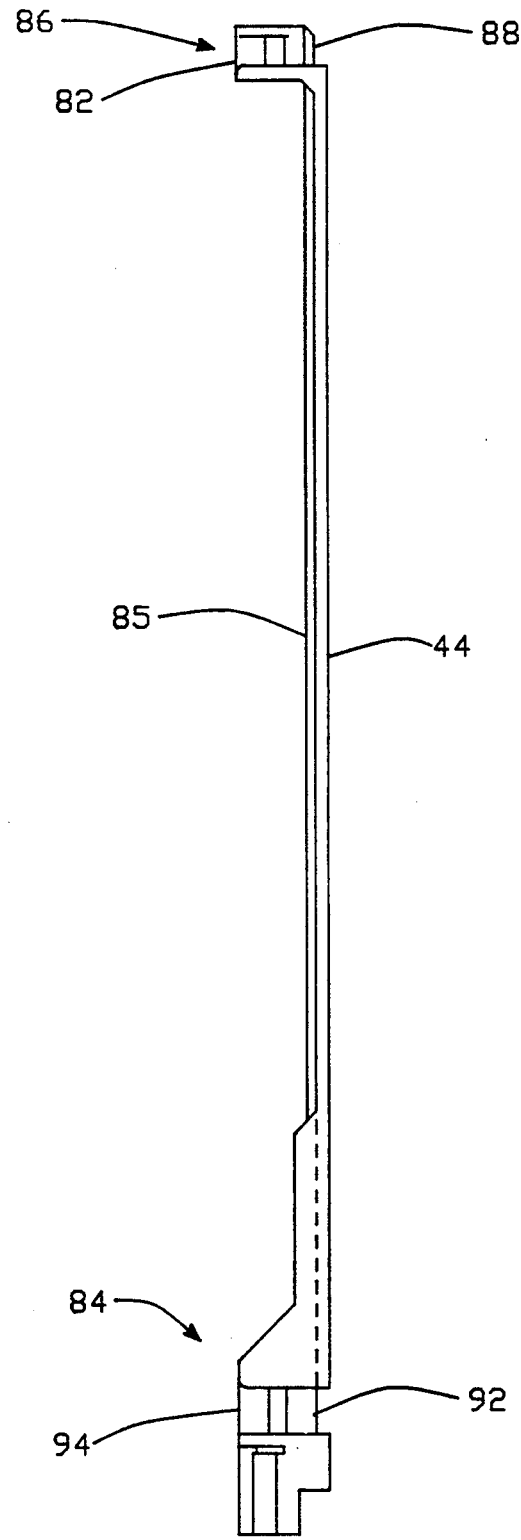
FIG. 12 depicts a top view of a door of the embodiment of FIG. 11.
Figure 13:
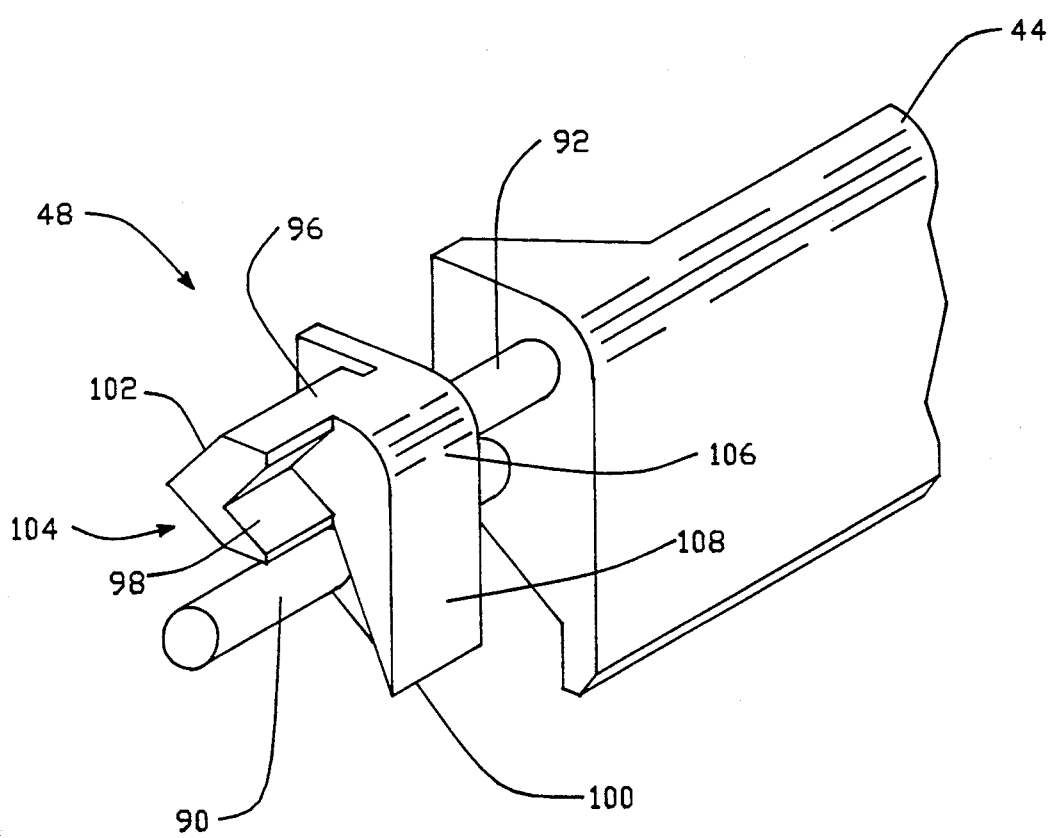
FIG. 13 depicts a perspective view of a portion of the mounting device for the door of an embodiment of the invention of FIG. 1.

Turning to FIGS. 11, 12 and 13, various views of the door are presented. The door 44, as can be seen in FIGS. 4, 11 and 12 is an elongate rectangle. In a top view, as can be seen in FIG. 12, the door is substantially "U" shaped being so defined by tabs 82, 84 extending perpendicularly and rearwardly therefrom. Extending from tab 82 are first and second pins 86, 88. Extending from tab 84 are first and second pins 90, 92. Pins 90, 92 form part of the mounting mechanism 48 which allows the door 44 to move from a closed position to an open position where the door 44 is positioned in a plane substantially parallel to the plane of the disk. In addition to the other embodiment, which include a solid one-piece casting of a material such as Lexan and in a more preferred embodiment with the door itself being made out a rigid stainless steel portion with the tabs or hinges 82, 84 being comprised of molded Lexan 920, and in a less preferred embodiment which can include a door which is stiffened with an elongated rectangular metallic insert 85. This insert is glued to the back of the door which is, for example, made out of Lexan, as is shown in FIG. 12.

Mounting mechanism 48 includes a body 96. As can be seen in FIG. 13, second pin 92 extends only between the body 96 and the door 44. First pin 90 extends on both sides of the body 96. Body 96 includes a first surface 98 for receiving a finger mechanism (described below) from the drive 130 for causing the door 44 to pivot to the open position and a second surface 100 for also receiving the finger mechanism for ensuring that the door 44 is held in the open position. As can be seen in FIG. 13, the first surface 98 in the preferred embodiment is substantially "V" shaped and concave. A complementary "V" shaped and convex third surface 102 is defined adjacent to the first surface 98 by another portion of the body 96. The surfaces 98, 102 define a substantially chevron shaped engagement portion 104, which engagement portion 104 will be engaged by the locking mechanism 50 described hereinbelow which is used to lock the door 44 in the closed position of FIG. 1.

As can be seen in FIG. 13, the second surface 100 is disposed about 90 degrees from the first surface 98. Thus as the door 44 is urged to the open position, the second surface 100 comes into engagement with the finger mechanism of the disk drive in order to bias the door to a more open position. Thus, it is to be understood that the first finger opens and holds the door in an opened position with the second finger, in a preferred embodiment, biasing the door an additional one or two degrees to a more open position. As can be seen in FIG. 13, in order to allow the body 96 to clear the interior surface 70 of the top portion 24, a curved portion 106 is provided which extends from adjacent the first surface 98 to a flat portion 108 which extends to the second surface 100.

For the embodiment shown in FIG. 13, the pin 92 is located upwardly and toward the door 44 from the first pin 90. Further the first surface 98 is located in a plane which is offset from a plane of the second surface 100 which accounts for the about 90 degree separation discussed above.

It is to be understood that the first and second pins 86, 88 extending from the tab 82 engage slots similar in design to first and second slots 110, 112 and have a spring similar to spring 114 disposed about first and second pins 86, 88 in order to facilitate the smooth opening and closing of the door.

Turning to FIGS. 15*a*, 15*b* and FIGS. 16*a*, 16*b* it can be seen that first and second pins 90, 92 are received respectively in first and second slots 110, 112. Slot 110 is substantially perpendicular to the plane of the disk 42 with slot 112 being substantially perpendicular to the slot 110 and parallel to the plane of the disk 42.

A biasing device or spring 114 is retained in the cartridge 20 and is wound about the first pin 90 so as to hold it away from a first end 116 of first slot 110 as can le seen in FIG. 15b. The spring 114 is then disposed about the third surface 102 of the engagement portion 104 in order to basis the engagement portion 104, and the body 96, so that the second pin 92 is urged towards the first end 118 of the second slot 112.

In this configuration the door locking mechanism 50 can engagingly lock the engagement portion 104 of the door mounting mechanism 48 As can be seen in FIG. 15a, the locking mechanism 50 includes an arm 122 which is piviotly pinned at pivot point 124. The arm is urged into engagement with the engagement portion 104 by a lock spring 126. The locking mechanism 50 includes a recess 128 which exactly mates to the engagement portion 104 in that the recess 128 is substantially a groove which has facing concave and convex "V" shaped surfaces which mate with the "V" shaped surfaces 98, 102 of the engagement portion 104 as seen in FIGS. 15a, 15b.

A disk drive 130 into which the cartridge is received includes a finger mechanism 132 which includes first and second fingers 134, 136. First finger 134 is substantially "Z" shaped and includes a mounting end 138 which is secured to the disk drive 130 and a free end or engaging end 140. The free end or engaging end 140 is substantially parallel to, but translated inboard of, mounting end 138 relative to the drive 134 so that it can be received in a portion of the "L" shaped slot 46 (FIG. 1). The tip 142 of the free end 140 of the first finger 134 includes a curved portion 144 and a beveled portion 146. The beveled portion 146 is meant for engaging a leveled portion 123 of the looking mechanism 50 in order to urge mechanism 50 sidewardly along the horizontal leg of "L" shaped slot 46 in order to disengage the recess 128 from the engagement portion 104 of the mounting mechanism 94 as can be seen in FIGS. 16a, 16b. This disengaging motion thus spaces the looking mechanism 50 from the mounting mechanism 48 as can be seen in FIG. 2. It is to be understood that in FIG. 2, the finger mechanism 132 has been removed so that the positioning of the locking mechanism 50 and the mounting mechanism 48 can be clearly seen.

With the locking mechanism 50 moved outwardly, the curved portion 144 of the tip 42 of the first finger 134 comes into engagement with the "V" shaped first surface 98. The tip 142 urges the first surface 98, the engagement portion 104, and the mounting mechanism 50 rearwardly, causing the mounting mechanism 50 to pivot about the first pin 90. This simultaneously cause the first pin 90 to be urged downwardly toward the first end 116 of the first slot 110 against the force of the spring 114. Simultaneously, the second pin 92 is urged away from the first end 118 of the slot 112 against the force of the spring 114. As the second pin 92 passes over the first pin 90, the door moves into the semi-opened position as shown in FIG. 2. As the finger 134 is urged further into the cartridge 20 with the cartridge 20 being urged further into the drive 130, the finger 134 causes the engagement portion 104 and the second pin 92 to be further urged away from the first end 118 of the second slot 112. As this occurs, the first pin 92 is urged upwardly to about the position of FIG. 16b with the door fully opened as seen in FIG. 16a. In this position, the curved tip 148 of the second finger 136, which second finger 136 is mounted onto the first finger 134 and is substantially parallel to the first finger 134, engages the second surface 100 of the mounting means 48 in order to lockingly retain the mounting means 48 in a rearward position and thus retain the door 44 in the fully opened position as show in FIG. 16a. It is to be understood that the second finger 136, in a preferred embodiment, is comprised of a leaf spring.

When it is desired to remove the cartridge from the drive, the cartridge is ejected from the drive. As the cartridge is being ejected from the drive, the finger mechanism 132 which is affixed to the drive and thus stationary, is automatically removed from the interior the cartridge due to the motion of the cartridge. As this occurs, the door pivots to the closed position as shown in FIG. 1 and the looking mechanism 50 lockingly engages the mounting mechanism 48 in order to lock the door 44 in the closed position as shown in FIG. 1.

INDUSTRIAL APPLICABILITY

The removable cartridge 20 of the present invention provides for a design with a compact 3½ inch disk form factor. The door 44 of this design, when engaged by the drive is moved to the interior of the cartridge and positioned in a plane which is substantially parallel to the plane of the disk. Further, with the door so designed, the port through the cartridge which receives the heads and the actuator arm can be placed substantially across the port side of the cartridge with the exception of a space which locates the above door mounting mechanism 48 and the locking mechanism 50 with the "J" shaped groove 52 immediately below. Thus, the present design maximizes the opening by which the heads can access the disk and provides a looking mechanism to ensure that the door will not be opened without the cartridge being inserted in the drive. This design further ensure that door once opened, will be retained in the opened position.

Additionally, as indicated above, the cartridge has been designed in order to ensure that it can be properly handled and inserted into the drive in only the proper orientation so that no damage can result to the heads, actuator arms, or the cartridge itself.

Other objects, aspects and advantages of the invention can be obtained from a view of the claims and the appended figures.

It is to be understood that other embodiments of the present invention can be constructed and be within the spirit and scope of the present invention.

I claim:

1. A removable cartridge for a disk drive including:
a housing;
a data storage disk;
means for rotatably mounting the disk in the housing;
a housing door; and
means for movably mounting the door relative to the housing so that the door is movable between a closed position and an open position wherein with the door in the open position, said door is (1) positioned in a plane that is parallel to the disk and (2) located substantially within the housing and with the door in the closed position, said door is perpendicular to the disk.

2. The cartridge of claim 1 including:
said door having a first pin and a second pin extending therefrom;
said mounting means having a first groove for receiving said first pin and a second groove for receiving said second pin, wherein said first groove is provided at an angle with respect to the second groove and wherein as said door moved from the closed position to the open position the first and second pins move relative to the first and second grooves respectively.

3. The cartridge of claim 2 including:
said first groove disposed substantially parallel to the disk;
said first groove having a first end and a second end;
said second groove having a first end and a second end;
biasing means for simultaneously biasing said first pin toward said first end of the first groove and for holding said second pin spaced from the first end of the second groove with the door in the closed position.

4. The cartridge of claim 1 including:
means for locking said mounting means with the door in the closed position.

5. The cartridge of claim 1 including:
said mounting means including engaging means adapted for being engaged by a disk drive so that said door oan be urged from the closed position to the open position.

6. The cartridge of claim 5 including:
means for locking said mounting means with said door in the closed position, said locking means including means for engaging said engaging means in order to lock said door in the closed position.

7. The cartridge of claim 5 including:
said mounting means further including means adapted for being engaged by a disk drive in order to hold said door in the open position with the cartridge inserted in the disk drive.

8. The cartridge of claim 3 including:
said biasing means for allowing the second pin to be initially urged toward the first end of the second groove and then causing the second pin to move away from the first end of the second groove as the first pin is urged toward the second end of the first groove in order to position the door in the open position.

9. The cartridge of claim 1 including:
said mounting means including a first surface adapted to be engaged by a disk drive for causing the door to be moved from the closed position to the open position and a second surface adapted to be engaged by a disk drive for causing the door to be held in the open position.

10. The cartridge of claim 9 including:
said first surface being placed about 90 degrees from the second surface.

11. The cartridge of claim 9 including:
said mounting means being rotated as the door moves from the closed position to the open position; and
said second surface located relative to the first surface such that the second surface becomes engaged with the drive substantially simultaneously with the door reaching the open position.

12. The cartridge of claim 9 including:
means for locking said mounting means with the door in the closed position, said locking means being biased toward and into engagement with the mounting means with the door in the closed position;
said locking means located adjacent to the mounting means;
said mounting means and the locking means adapted for being engaged by a finger of the drive in order to separate the locking means from the mounting means preparatory to the finger urging the mounting means to cause the door to move toward the open position.

13. The cartridge of claim 1 including:
means for locking said mounting means with the door in the closed position, said locking means being biased toward and into engagement with the mounting means with the door in the closed position;
said looking means located adjacent to the mounting means;
said mounting means and the locking means adapted for being engaged by a finger of the drive in order to separate the locking means from the mounting means preparatory to the finger urging the mounting means to cause the door to move toward the open position.

14. The cartridge of claim 13 including:
means for securing said locking means relative to the housing so that as said locking means is urged away from the mounting means said locking means moves in a plane substantially parallel to the plane of the disk.

15. The cartridge of claim 14 including:
said locking means secured to the housing for being urged outwardly from the disk as the locking means is urged out of locking engagement with the mounting means.

16. The cartridge of claim 1 including:
said mounting means including a body with a first pin and a second pin projecting therefrom, said second pin spaced from said first pin;
said body including a first surface adapted for being engaged by a disk drive for causing the mounting means to move as the door is urged to the open position; and
said body including a second surface adapted for being engaged by a disk drive for causing the mounting means to retain the door in the open position.

17. The cartridge of claim 16 including:
said body wherein said second pin is located upwardly and toward the door from said first pin;
said first surface is located above said first pin; and
said second surface is located toward the door from said first pin.

18. The cartridge of claim 1 including:
said mounting means including a body;
said body including a first surface adapted for being engaged by a disk drive for causing the mounting means to move as the door is urged to the open position;
said body including a second surface adapted for being engaged by a disk drive for causing the mounting means to retain tho door in the open position. said second surface spaced from the first surface; and
said first surface located in a plane offset from a plane of the second surface.

19. The cartridge of claim 18 including:
said first surface mounted with respect to the second surface such that as the door moves to the open position said second surface rotates in a manner so as to be also engagable by a disk drive.

20. The cartridge of claim 1 including:

a groove located adjacent to the mounting means and adapted for receiving a member from a drive for lockingly positioning said cartridge into a drive.
21. The cartridge of claim 20 including:
said groove being substantially J-shaped.
22. The cartridge of claim 20 including:
said housing having a port side defining a port adjacent to which said door is mounted for allowing access to the disk with the door in the open position; and
said groove extending to and communicating with the port side.
23. The cartridge of claim 22 including:
said housing having a first planar surface which is substantially parallel to the disk and which communicates with the port side; and
said groove defined in the planar surface.
24. The cartridge of claim 23 including:
said housing having a second planar surface which is substantially parallel to the disk and located on an opposite side of the disk from the first planar surface and which second planar surface communicates with the port side; and
a bevel defined in the second planar surface along an edge thereof which is substantially perpendicular to the port side; and
which bevel is adjacent the groove, and which bevel is for preventing said cartridge from being incorrectly inserted into said drive.
25. The cartridge of claim 24 including:
a tack side connected between the first and second planar surfaces, which back side is substantially parallel to the port side; and
tab means extending from said back side for preventing the cartridge from being inserted into the drive incorrectly.
26. The cartridge of claim 25 including:
first and second connecting side which connect between the port and the back sides; and
first and second engagement recess means located in the first and second connecting sides respectively and adjacent to the tab means for allowing said cartridge to be engaged and repositioned.
27. The cartridge of claim 24 including:
a back side connected between the first and second planar surfaces, which back side is substantially parallel to the port side;
first and second connecting side which connect between the port and the back sides; and
first and second engagement recess means located in the first and second connecting sides respectively and adjacent to the tab means for allowing said cartridge to be engaged and repositioned.
28. The cartridge of claim 20 including:
said groove directed substantially across a direction of insertion of the cartridge into a drive.
29. The cartridge of claim 20 including:
said groove directed substantially along and then across a direction of insertion of the cartridge into a drive.
30. The cartridge of claim 1 including:
a triangular shaped recess provided in the housing and adapted to provide clearance for a head from a disk drive.
31. A removable cartridge for a disk drive including:
a housing;
a data storage disk;
hub mans for rotatably mounting the disk in the housing;
said housing including a first planar outer wall and a second planar outer wall, which planar walls are substantially parallel to the disk and located on opposite sides of the disk with the hub extending through a port in one of the first and second planar outer walls; and
said one of said first and second planar outer walls has an inner surface located adjacent to the disk which inner surface has a plurality of spiraling fins extending therefrom for directing air toward said hub as said hub rotates.
32. The cartridge of claim 31 including:
said first planar outer wall has said inner surface with the plurality of spiraling fins and said hub extending therethrough.
33. The cartridge of claim 32 including:
said second planar outer wall has an inner surface located adjacent to the disk which inner surface has a plurality of radial fins extending therefrom for directing air toward said hub.
34. A removable cartridge adapted for insertion into a disk drive in order to minimize the distance between the center of a data storage disk contained in the cartridge and a pivot point for an actuator arm upon which is mounted a read/write head for reading data stored on the disk comprising:
a housing;
means for rotatably mounting the data storage disk in the housing;
a housing door; and
means for movably mounting the door relative to the housing so that the door is movable between a closed position and an open position wherein with the door in the open position, said door is (1) positioned in a plane that is parallel to the disk and (2) located substantially within the housing so as minimize the distance between the center of the disk and the pivot point of the actuator arm which is inserted past the open door and through the cartridge in order to position the read/write head adjacent to the disk and with the door in the closed position, said door is perpendicular to the disk..

* * * * *